United States Patent
Lutz et al.

(10) Patent No.: US 6,631,699 B2
(45) Date of Patent: Oct. 14, 2003

(54) AIR FUEL MODULE

(75) Inventors: Michael Lutz, West Bloomfield, MI (US); Manzurul Haque, Utica, MI (US); Piero Caporuscio, Shelby Township, MI (US); Phillip G. Iott, Auburn Hills, MI (US); Larry Hiltunen, Rochester Hills, MI (US); Herbert Lacher, Leiblfing (DE); Nikolaus Kerner, Wenzenbach (DE)

(73) Assignee: Siemens VDO Automative Corporation, Auburn Hills, MI (US)

( * ) Notice: Subject to any disclaimer, the term of this patent is extended or adjusted under 35 U.S.C. 154(b) by 0 days.

(21) Appl. No.: 10/028,749

(22) Filed: Dec. 20, 2001

(65) Prior Publication Data

US 2003/0010299 A1 Jan. 16, 2003

Related U.S. Application Data

(60) Provisional application No. 60/257,305, filed on Dec. 20, 2000.

(51) Int. Cl.[7] .................................................. F01L 1/34
(52) U.S. Cl. .............................. 123/90.15; 123/90.11; 123/90.17; 123/90.16
(58) Field of Search ........................... 123/90.11, 90.15, 123/90.16, 90.17, 445, 446

(56) References Cited

U.S. PATENT DOCUMENTS

| | | | | |
|---|---|---|---|---|
| 4,015,572 A | * | 4/1977 | Leshner et al. | 123/139 AW |
| 4,450,817 A | * | 5/1984 | Ibuki et al. | 123/501 |
| 4,479,476 A | * | 10/1984 | Suzuki et al. | 123/478 |
| 4,840,263 A | * | 6/1989 | Kato et al. | 192/109 F |
| 5,752,478 A | * | 5/1998 | Sono et al. | 123/90.11 |
| 6,024,060 A | * | 2/2000 | Buehrle et al. | 123/90.12 |
| 6,308,670 B1 | | 10/2001 | Hammoud et al. | 123/90.15 |
| 6,308,690 B1 | | 10/2001 | Sturman | 123/508 |
| 6,338,323 B1 | * | 1/2002 | Machida | 123/90.17 |
| 6,431,131 B1 | * | 8/2002 | Hosoya et al. | 123/90.15 |

FOREIGN PATENT DOCUMENTS

| | | | | |
|---|---|---|---|---|
| EP | 0245540 | | 11/1987 | |
| JP | 11210879 A | * | 8/1999 | F16H/61/40 |
| WO | 9919615 | | 4/1999 | |

* cited by examiner

Primary Examiner—Thomas Denion
Assistant Examiner—Ching Chang

(57) ABSTRACT

A method for controlling valve actuation comprises the steps of communicating at least one dithering signal to preload the valve. An event signal is then communicated. The dithering signal is altered based on the cycle time for the valve. The preferred application is for camless engine valve control.

17 Claims, 4 Drawing Sheets

AIR FUEL MODULE

This application claims priority to U.S. Provisional Patent Application Serial No. 60/257,305 filed on Dec. 20, 2000.

BACKGROUND OF THE INVENTION

This invention relates to a method and algorithm for controlling the amount of "dithering" or preloading of a cyclic valve system.

Valve systems are known which are cyclically opened and closed. In many of these systems the speed of the opening and closing cycle may vary as the device associated with the valve system also changes in speed. One challenge is to associate the control sending the signal to open and close the valve in a proper timed fashion with the actual operation of the valve. Most valves have some "lag" time associated with their operation.

One recent application of such valves is to camless engine technology. A camless engine employs solenoid actuators to control hydraulic fluid flow and operate the valves of the engine rather than an engine cam. In the typical engine, a cam mechanically rocks open and close the valves of a combustion chamber of an engine. Thus, timing is a simple method of cam position. For a camless engine, however, the valves are actuated by electromagnetic plungers tied to an engine control unit. Camless engines may be more fuel efficient than engines using cams, however, timing is not as easily achieved.

Correct engine timing is as important to a camless engine as it is to a cam engine. However, there are challenges to the design of a camless engine not present for conventional engines. Specifically, the solenoids and hydraulic valves introduce a certain amount of lag. This lag may arise from the additional time required to charge the solenoid valves as well as to actuate the hydraulic valves of the system. At lower speeds this lag is particularly pronounced and presents challenges.

One proposed way to cure this lag has been to dither the electromagnetic plunger to prime the system for correct engine timing. For example, a series of short electrical signals may be sent to the electromagnetic plunger actuating the plunger and thereby allowing hydraulic fluid flow to begin actuating the hydraulic valve. After the electromagnetic plunger and the hydraulic valve are primed, then the engine control unit sends an "event signal," either fully opening or closing the valve, for the desired duty cycle of the event.

Such a system would have a significant drawback. As a consequence of sending numerous priming signals prior to sending an event signal, large amounts of energy are consumed by the electrical system. Thus, employing the strategy may not be practical.

A need, therefore, exists for an engine control strategy that consumes less energy than existing techniques.

SUMMARY OF THE INVENTION

In general, the present invention utilizes a system which "dithers" or preloads a cyclically operating valve system in such a fashion that the amount of dithering changes as the speed of operation of the valve system changes. Generally, as the cycle time for the valve is reduced the amount of necessary preloading to reduce lag time is also reduced. Thus, as the cycle time decreases the amount of dithering decreases.

One preferred application of the present invention offers an inexpensive and economical engine management strategy. Rather than employing the same dithering scheme throughout the entire range of engine speeds, the invention employs a dithering scheme that varies with engine speed. Accordingly, a dithering signal is communicated to an actuator of the camless engine. The signal activates the actuator for a portion of an event time period less than the event time period. An event signal is sent to the actuator that lasts the entire event time period, activating the actuator for this period. The engine speed is sensed. Then, based upon this sensed speed, the dithering signal may be altered. For example, in some cases plural dithering signals may be sent prior to the event signal. In such a system the number of dithering signals could decrease as the speed of the camless engine increases. Additionally, the length of each dithering signal may decrease as the speed of the camless engine increases. This vary the dithering signal based on engine speed thereby results in significantly less consumption of energy during operation of the vehicle engine.

Such a strategy may be employed for the air intake and exhaust valves of a combustion chamber of the engine. In addition, the technique may be employed for a fuel injector system.

Moreover, the signal strategy may only alter the dithering signals over selected ranges of engine speeds. The dithering signals may also vary from each other. Thus, the strategy permits flexibility in the dithering of the camless engine. The technique employs existing hardware as well to avoid expense. The technique may use existing engine control units and a crank position sensor. This hardware is already in use with current camless engines.

The disclosed system utilizes a solenoid which is driven to open and close and allow the flow of hydraulic fluid to the actual valve. It is a solenoid valve which is "dithered" to begin the flow of hydraulic fluid and preload the hydraulic valve.

However, it should be understood that the basic concept can be expanded to any type of valve system which may benefit from the "preloading" as mentioned above. Generally, any valve which has a cyclic operation time which varies across the range of the system associated with the valve system may benefit from this invention.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
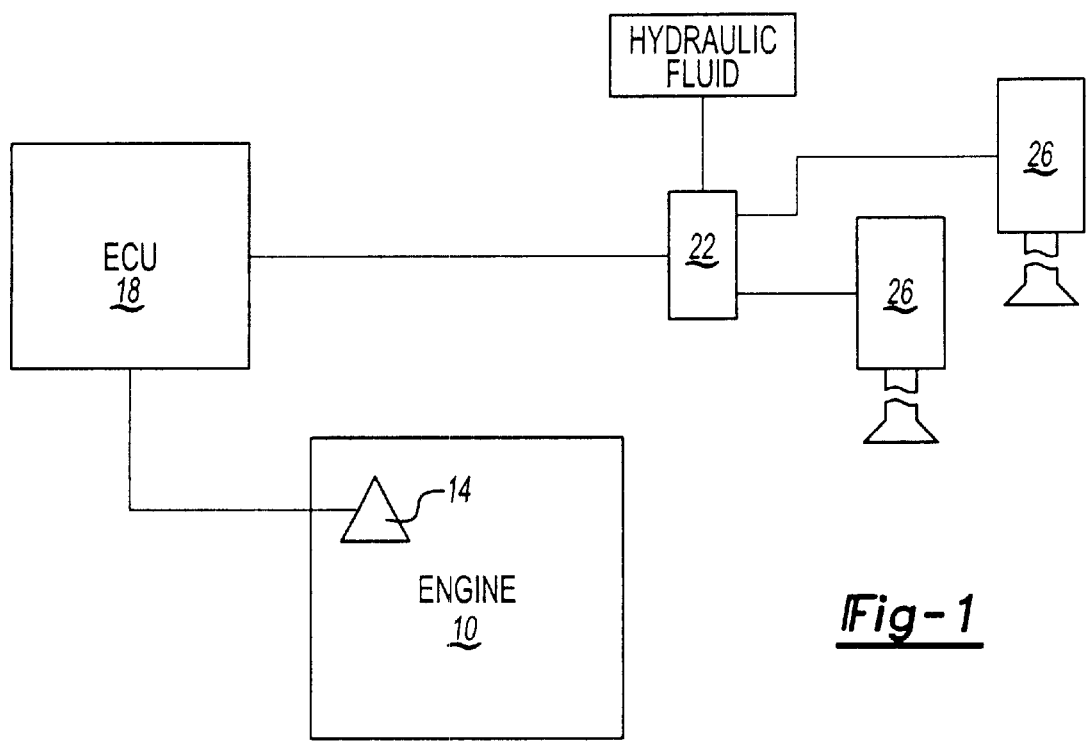
FIG. 1 illustrates a schematic diagram of the engine control unit, sensor, engine, actuator, and hydraulic valve.

FIG. 1 illustrates a schematic view of a system employing the inventive method. Shown are engine 10, crank position sensor 14, engine control unit 18, actuator 22, and valves 26.

As known, engine control unit 18 communicates with and manages the actuation of valves 26 through actuators 22, typically solenoid electromagnetic plungers. Valves 26 may each represent an air intake or exhaust valve for camless engine 10. A signal for an event, such as the opening or closing of the valve, is sent to actuator 22 by engine control unit 18. Actuator 22 then actuates hydraulic valve 26. However, a time lag exists between the sending of the event signal and the actual movement of hydraulic valve 26. This delay may stem from the time required to charge actuator 22 to fire as well as the time required to actuate hydraulic valve 26. As shown, there are plural valves 26 (typically there will be one for each engine cylinder) which are actuated cyclically.

Figure 1A:
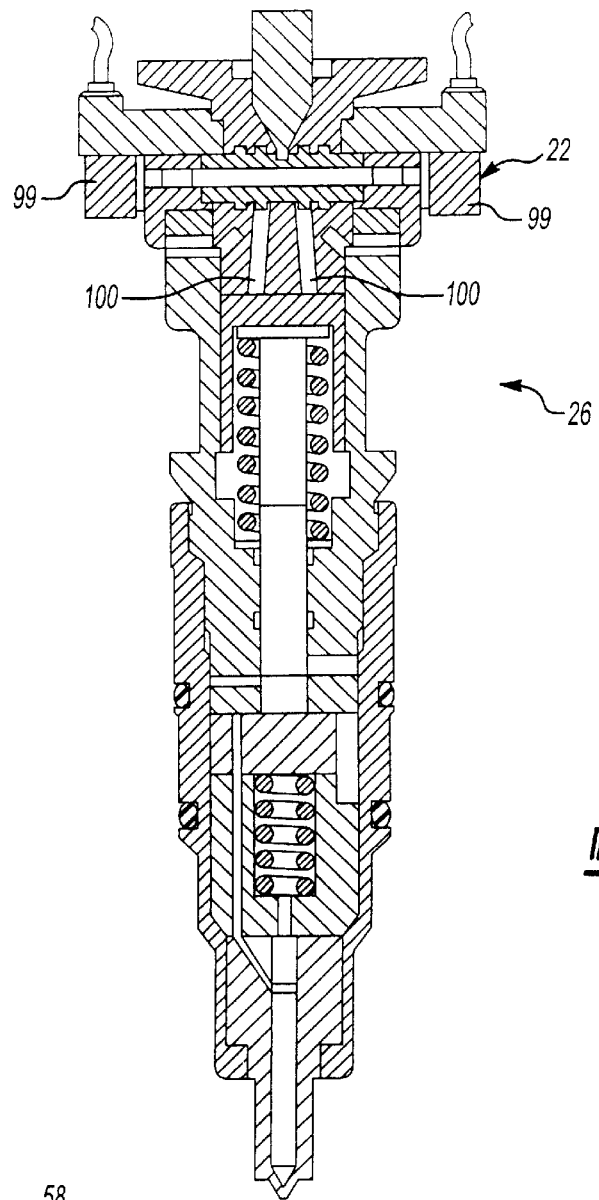
FIG. 1A shows an example solenoid and hydraulic valve.

As shown in FIG. 1A, the solenoid 22 moves between a retracted and extended position to control the flow of hydraulic fluid through passages 100 under the control of two coils 99. As can be appreciated from the schematic of FIG. 1A, the passage 100 communicates with the hydraulic valve 26, driving the hydraulic valve between its extreme open and close positions. As can be also appreciated, by preloading the hydraulic valve, the "lag" time between the decision to fire the valve and the actual movement of the valve can be greatly reduced. This one valve arrangement is shown only as one example, and other valve arrangements will come within the scope of this invention.

Figure 2:
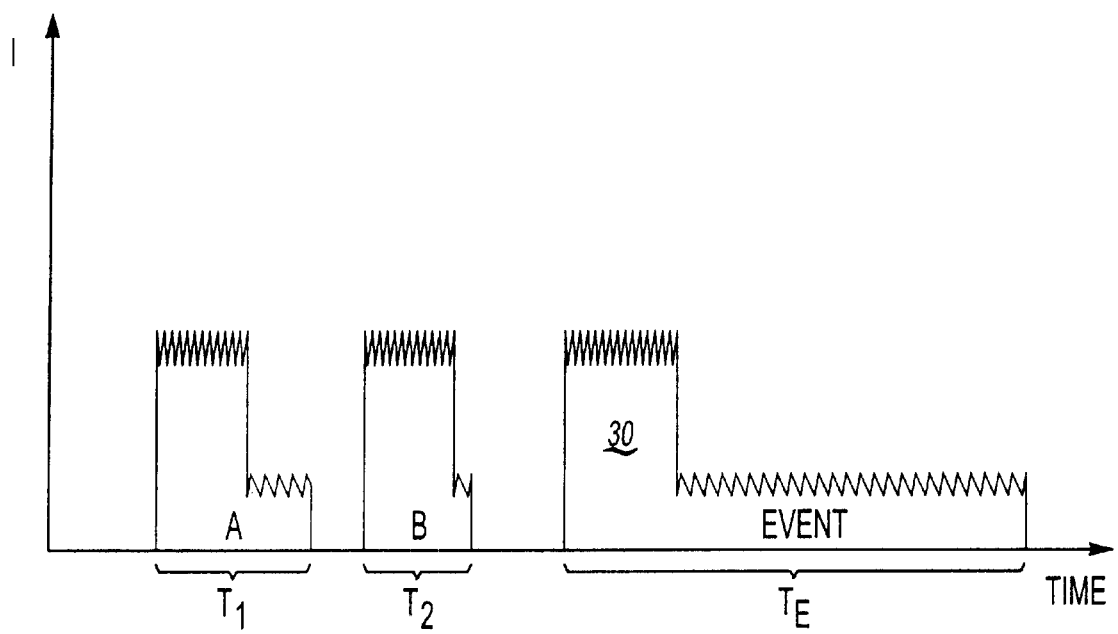
FIG. 2 illustrates a dithering strategy.

As shown in FIG. 2, one way to address this time lag is to prime actuator 22 and hydraulic valve 26 to receive the event signal. Accordingly, dithering signal A and dithering signal B may be sent from engine control unit 18 to actuator 22 in advance of event signal 30. These signals have sufficient pulse current to actuate or fire the electromagnetic plunger of actuator 22, which itself is coupled to hydraulic valve 26. Following these two dithering signals, event signal 30, driving the solenoid to allow fluid flow and cause hydraulic valve 26 either to open or close, is sent. Dithering signal A and B have duty cycles, $T_1$ and $T_2$ respectively, which are less than the duty cycle, TE, of event signal 30.

Figure 3:
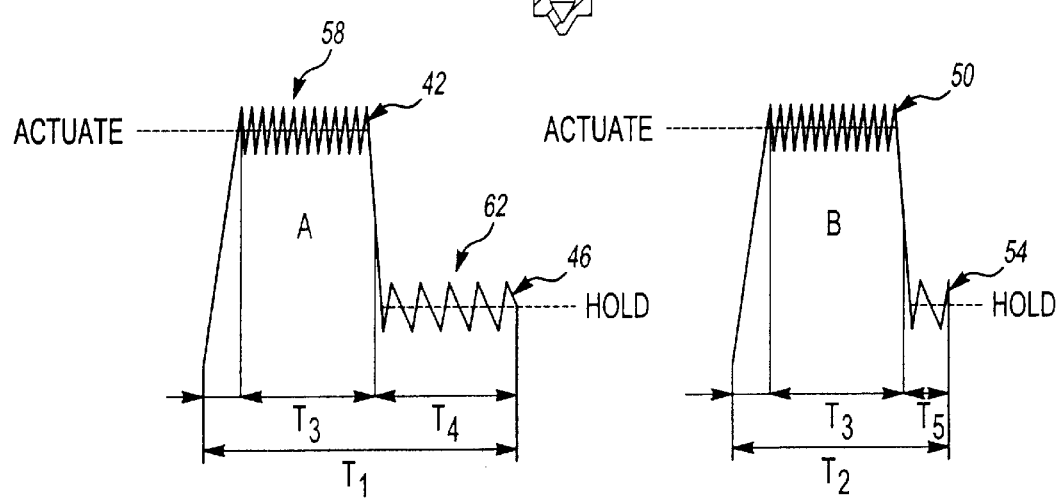
FIG. 3 illustrates two different types of dithering signals that maybe employed as part of a dithering strategy.

As shown in FIG. 3, duty cycle of dithering signal A may be less than duty cycle of dithering signal B. Moreover, each dithering signal, A or B, may comprise two components, an actuation current and a hold current. Dithering signal A may have actuation current 42, which on average is enough current to actuate actuator 22 and accordingly hydraulic valve 26. Dithering signal A may also have hold current 46, which is sufficient current to continue actuation of actuator 22 but is less than current required to fire actuator 22. Also, dithering signal B may have actuation current 50, which is also sufficient to fire actuator 22 and hydraulic valve 26. It may also have hold current 54, which is sufficient to continue actuation of actuator 22.

Notably, dithering signal A and dithering signal B may differ in the length of time that hold current is maintained. As shown in FIG. 3, hold current 46 is maintained for time period $T_4$ while dithering signal B has hold current 54, which is maintained for time period $T_5$, a time period less than time period $T_4$. One of ordinary skill in the art can appreciate other ways to alter dithering signals to best suit the engine timing for a particular engine.

Also shown in FIG. 3 are variations in actuation current 42 and hold current 46. Variation 58 and variation 62 may comprise signal noise and should be sufficiently small to avoid undesired actuation of actuator 22 and hydraulic valve 26. Such noise may also be present on event signal 30.

Figure 4:
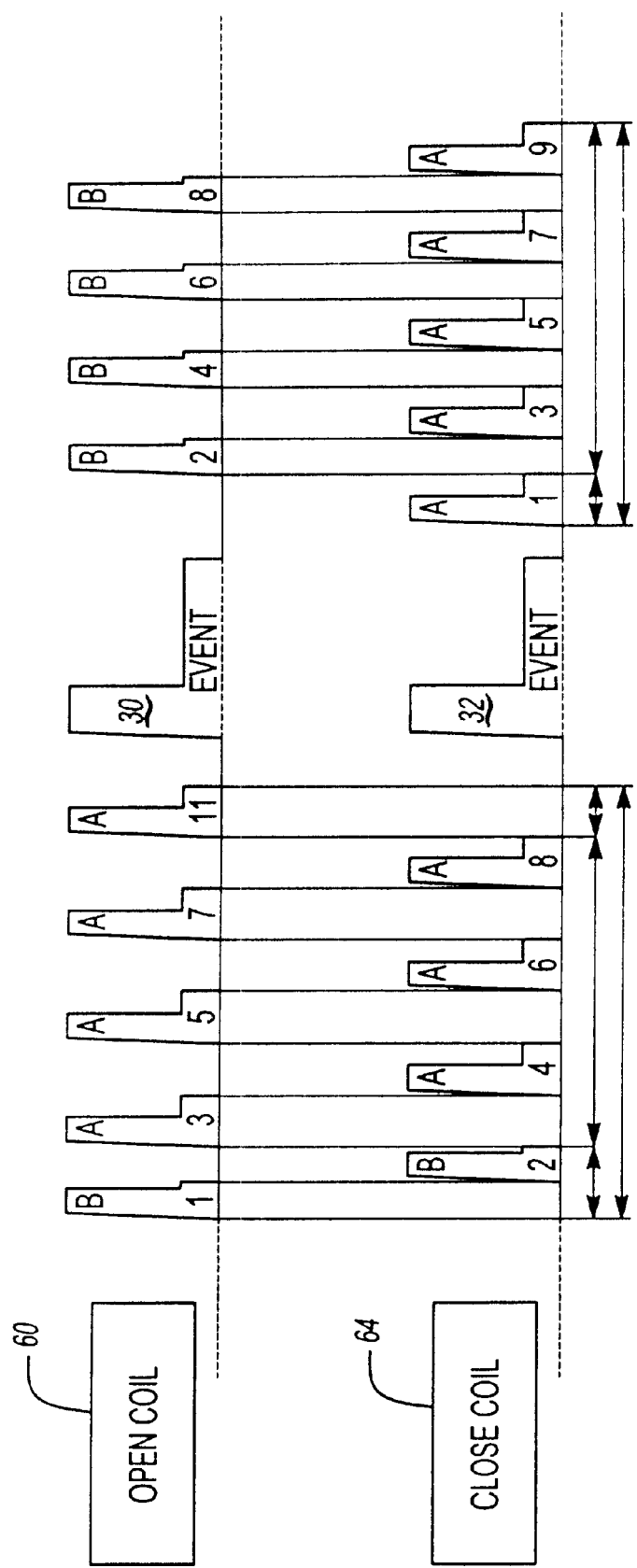
FIGS. 4 and 5 illustrate the inventive dithering strategy, highlighting the alteration of the dithering signal as engine speed changes.
Figure 5:
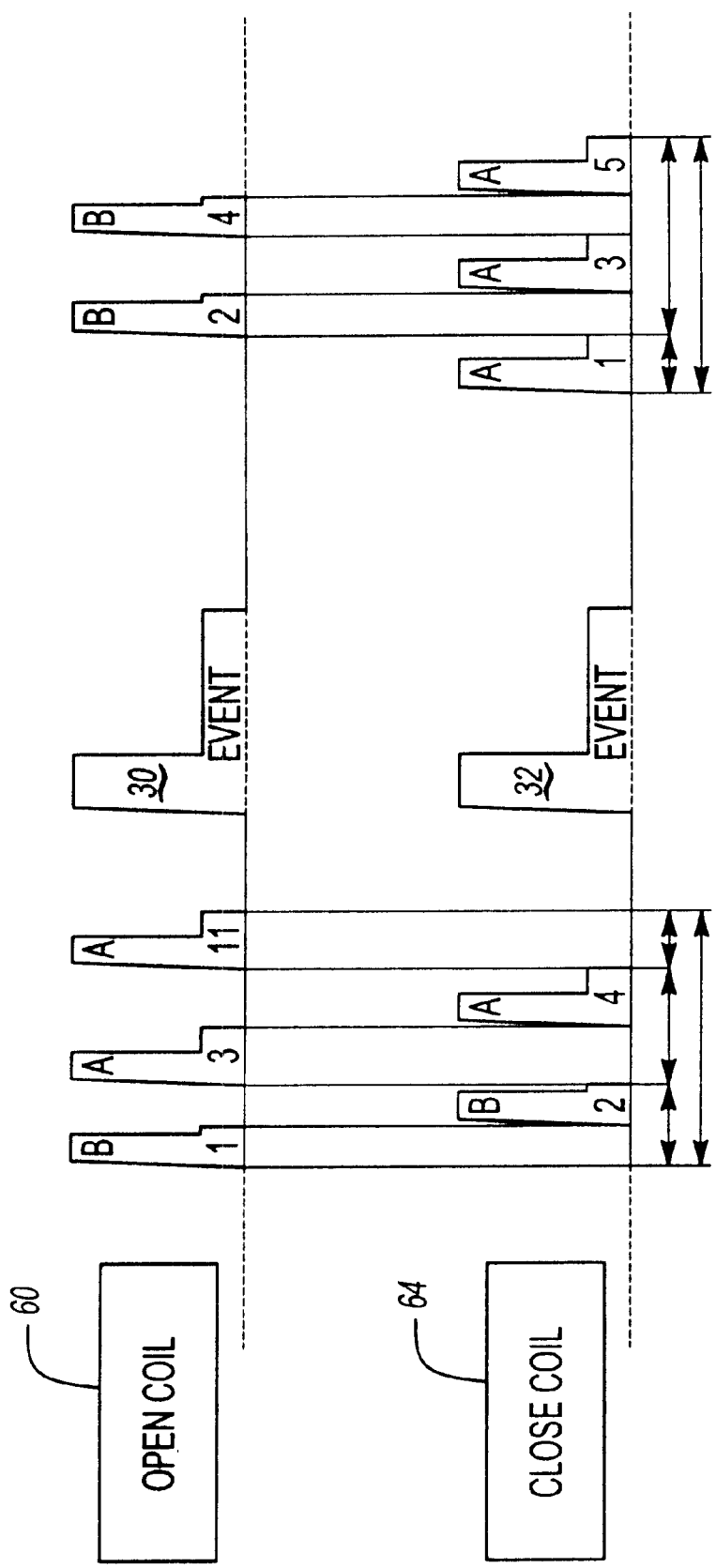

FIGS. 4 and 5 illustrate a power saving technique in the use of dithering signals. FIG. 4 illustrates a signal pattern from the engine control unit to actuator 22 for a particular range of engine speeds as sensed by crank position sensor 14. For open coil 60, event signal 30 is shown preceded by five dithering signals and followed by four dithering signals. Depending on the engine and management strategy, dithering signals may be of different types determined by trial and error or testing to maximize responsiveness. For close coil 64, event signal 32, signal for closing coil, is shown preceded by four dithering signals and followed by five dithering signals. Of course, these signals are example, and other numbers may be determined to be preferred for certain applications.

FIG. 5 illustrates a signal pattern for the same engine for a higher range of engine speeds than represented by FIG. 4. As shown, the number of dithering signals decreases as the engine speed increases. This is so because there is less need to dither as engine speed increases. The amount of "down time" between actuation decreases. Thus, event signal 30 may be preceded by three dithering signals and followed by two. Event signal 32 may be preceded by two dithering signals and followed by three. Of course, these signals are examples and other numbers maybe determined to be preferred for certain applications.

The reduction of dithering signals may follow an inverse linear pattern. That is, as engine speed increases, the number of dithers may decrease linearly. Alternatively, as engine speed decreases, the numbers of dithers may increase linearly. Moreover, the duration, duty cycle, of dithering signals may also decrease with engine speed and increase as engine speed slows. Both the number of dithers and their duration may vary for particular ranges of engine speed as well. For example, for one particular engine speed range, say 0 to 2000 rpm's, there may be x number of dithers prior to the sending of an event signal and y number of dithers set after. When the engine increases speed to a higher range, say from 2000 rpm's to 4000 rpm's, the total number of dithering signals may be reduced.

As shown in FIGS. 4 and 5, the dithering strategy employed is for a two coil actuator. The actuator has an open coil that when powered opens or moves the electromagnetic plunger in one direction while another coil, a close coil, moves the electromagnetic plunger in the opposite direction when powered. Such a system maybe used for a fuel injector system. Also as known, for a combustion chamber valve, such as an air intake valve or an air exhaust valve, there may be only an open coil with the work of the closed coil replaced by a closing spring.

Again, the most preferred application of the present invention is to the disclosed camless engine, or other camless engine valve arrangements. However, the basic idea can be extended to any cyclically operated valve wherein preloading of the valve is desirable, and more important particularly at slower cycle times.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of controlling a valve system including plural cyclically operated valves comprising the steps of:

communicating at least one dithering signal to actuate one of said valves, the at least one dithering signal activating the at least one valve and lasting a portion of an event time period less than the event time period;

communicating an event signal to the at least one valve, the event signal lasting the event time period and activating the at least one valve;

sensing a cyclic operation timing for said at least one valve; and altering the at least one dithering signal based on the cyclic operation timing.

2. The method of claim 1 wherein at least one dithering signal comprises a number of dithering signals and wherein the number of dithering signals decreases as the frequency of valve operation increases.

3. The method of claim 1 wherein said altering comprises decreasing the time of the dithering signal.

4. The method of claim 1 wherein said valve system is associated with a camless engine, and said cyclic operation timing is related to the speed of said engine, said speed of said engine being sensed to determine said cyclic operation timing, and the amount of dithering being reduced as said engine speed increases.

5. The method of claim 4 wherein altering comprises altering the dithering signal over a selected ranges of engine speeds, said altering occurring by defining a first dithering signal if said engine speed is within a first range, and a second dithering signal if said engine speed is within a second range, with said second dithering signal being associated with a higher speed range and being smaller than said first dithering signal.

6. The method of claim 1 wherein said at least one valve includes a solenoid valve which is actuated to control the flow of hydraulic fluid to a hydraulic valve.

7. The method of claim 1 wherein at least one dithering signal comprises a first dithering signal and a second dithering signal wherein the first dithering signal is different from the second dithering signal.

8. A method of controlling a camless engine comprising the steps of:

communicating at least one dithering signal to an actuator wherein the actuator actuates a hydraulic combustion chamber valve, the at least one dithering signal activating the actuator and lasting a portion of an event time period less than the event time period;

communicating an event signal to the actuator, the event signal lasting the event time period and activating the actuator;

sensing a speed of the engine; and altering the at least one dithering signal based on the speed of the camless engine.

9. The method of controlling the camless engine of claim 8 wherein said at least one dithering signal comprises a number of dithering signals and wherein the number of dithering signals decreases as the speed of the camless engine increases.

10. The method of controlling the camless engine of claim 8 wherein said altering comprises decreasing the portion of the event time of the dithering signal as the speed of the camless engine increases.

11. The method of controlling the camless engine of claim 8 wherein altering comprises altering the dithering signal over selected ranges of engine speeds, said altering occurring by defining a first dithering signal if said engine speed is within a first range, and a second dithering signal if said engine speed is within a second range, with said second dithering signal being associated with a higher speed range and being smaller than said first dithering signal.

12. The method of controlling the camless engine of claim 8 wherein at least one dithering signal comprises a first dithering signal and a second dithering signal wherein the first dithering signal is different from the second dithering signal.

13. A camless engine comprising:

a plurality of valves, operable to direct fluid into a combustion chamber of said engine;

a sensor for detecting an engines speed;

a control for directing an actuation signal to each of said plurality of valves in a cyclic fashion; and said control being programmed to determine said engine speed and provide both a dithering signal and an event signal, said dithering signal being operable to begin to preload said valve prior to the submission of said event signal, and said dithering signal being decreased as said speed of said engine increases.

14. A camless engine as set forth in claim 13 wherein said valve includes a solenoid valve which is controlled by said control to move to control the flow of hydraulic fluid to a hydraulic valve, said hydraulic valve being driven by said hydraulic fluid to control the flow of fluid to said combustion chamber.

15. The method of claim 1, wherein said at least dithering signal and said event signal are created as two distinct and separate signals separated by a period of time.

16. The method of controlling the camless engine of claim 8, wherein said at least dithering signal and said event signal are created as two distinct and separate signals separated by a period of time.

17. The camless engine as set forth in claim 13, wherein said control breeding said dithering signal and said event signal as two distinct signals separated by a period of time.

* * * * *